United States Patent [19]

Miyashita

[11] Patent Number: 5,165,378
[45] Date of Patent: Nov. 24, 1992

[54] IGNITION TIMING CONTROL SYSTEM FOR INTERNAL COMBUSTION ENGINE

[75] Inventor: Yukio Miyashita, Wako, Japan

[73] Assignee: Honda Giken Kogyo Kabushiki Kaisha, Tokyo, Japan

[21] Appl. No.: 738,025

[22] Filed: Jul. 30, 1991

[30] Foreign Application Priority Data

Aug. 11, 1990 [JP] Japan .................................. 2-213191

[51] Int. Cl.⁵ .............................................. F02P 5/14
[52] U.S. Cl. .................................................. 123/425
[58] Field of Search .................. 123/425, 435, 479; 73/35, 117.3; 364/431.08, 431.07

[56] References Cited

U.S. PATENT DOCUMENTS

| | | | |
|---|---|---|---|
| 4,892,074 | 1/1990 | Iriyama | 123/435 |
| 4,896,642 | 1/1990 | Washino et al. | 123/425 |
| 4,971,007 | 11/1990 | Gopp et al. | 364/431.08 |
| 4,981,124 | 1/1991 | Sellnar et al. | 123/425 |
| 4,991,554 | 2/1991 | Wataya | 73/117.3 |
| 5,038,735 | 8/1991 | Nosoyo et al. | 123/425 |
| 5,038,736 | 8/1991 | Ohkume et al. | 123/425 |

*Primary Examiner*—Raymond A. Neill
*Attorney, Agent, or Firm*—Nikaido, Marmelstein, Murray & Oram

[57] ABSTRACT

An ignition timing control system for vehicle internal combustion engines, in which the basic ignition timing is determined for a detected engine speed and load and when knock occurs, the basic ignition timing is retarded by a unit amount. A counter is provided for determining the occurrence rate of knock, the value of which is incremented each time knock occurs and is decrement if no knock occurs within a predetermined number of firings. Based on the counter values, a period is determined. When knock occurs, the retard adjustment is started and is continued for the period even when knock has ceased in the course of retard adjustment. The predetermined number of firings for defining a wait period before the counter value is decremented is set to equal the number of cylinders of the engine concerned. Alternatively, the predetermined number of firings can be varied with the knock occurrence rate counter value.

8 Claims, 9 Drawing Sheets

| NE \ PB | P$_{BKN0}$ | P$_{BKN1}$ | P$_{BKN2}$ |
|---|---|---|---|
| ∧<br>— N$_{ACT0}$ —<br>∨ | DADV<br>00 | 01 | 02 |
| — N$_{ACT1}$ —<br>∨ | 10 | 11 | 12 |
| — N$_{ACT2}$ —<br>∨ | 20 | 21 | 22 |
| — N$_{ACT3}$ —<br>∨ | 30 | 31 | 32 |
|  | 40 | 41 | 42 |

→ High engine load

↓ High engine speed

IGNITION TIMING CONTROL SYSTEM FOR INTERNAL COMBUSTION ENGINE

BACKGROUND OF THE INVENTION

This invention relates to an ignition timing control system for internal combustion engines, more particularly to an ignition timing control system for vehicle internal combustion engines that retards the ignition timing in response to the occurrence rate of combustion knock in the engine.

DESCRIPTION OF THE PRIOR ART

Vehicle internal combustion engines can be damaged by combustion knock. It has therefore been proposed to retard the ignition timing when knock occurs and then return the retarded ignition timing in the advance direction after knock has ceased. Such a system is disclosed, for example, in Japanese Patent Publication No. 62(1987)-17665. Specifically, the system disclosed in this publication retards the ignition timing by a unit angle when knock occurs and after knock has ceased, advances the retarded ignition timing selecting an advance unit angle based on the past history of knock occurrence state.

This prior art system is effective for avoiding the recurrence of knock after it has once been suppressed. The system has a drawback, however, in that when knock occurs the retard adjustment is carried out by only a predetermined unit angle so that it is not possible to eliminate knock in a short period. The disadvantage is more serious when knock recurs successively.

Moreover, when conducting knock control based on the past history of the knock occurrence state as taught by the prior art system, it is a common technique to use a ring buffer or the like as a memory for recording absence/presence of knock in respective firings. In this case, however, increasing the number of firings to be recorded requires the provision of greater memory capacity. Further, if, for example, the record shows that knock occurred in two firings in the past, there could mean that knock occurred at a short interval such as in two successive firings, or it could mean that knock occurred in two firings separated by a long interval, for example, in the first and the last firings among the recorded firings. However, the conventional technique does not discriminate between those two cases and considers them as the same knock occurrence rate.

SUMMARY OF THE INVENTION

In view of the foregoing, one object of the present invention is to provide an ignition timing control system for vehicle internal combustion engines for overcoming the aforesaid problems of the conventional systems.

Another object of the invention is to provide such a system in which the ignition timing is retarded in response to the knock occurrence rate such that knock can be suppressed in a relatively short period even in an engine operating region wherein knock could otherwise recur successively.

Still another object of the invention is to provide such a system in which the knock occurrence rate can be judged in a relatively simple manner using a memory having a small capacity.

This invention achieves these objects by providing a system for controlling ignition timing of a vehicle internal combustion engine including first means for detecting operating conditions of the engine including at least engine speed and engine load, second means for detecting knock occurring in the engine, control means for determining a basic ignition timing of the engine based on the detected engine speed and engine load and for adjusting the basic ignition timing in the retard direction when knock occurs and ignition means for igniting an air-fuel mixture in a combustion chamber of the engine. In the system it is arranged such that said control means includes counter means, the value of which is incremented each time knock occurs and is decremented if no knock occurs within a predetermined first period, means for determining, based on the counter value, a second period during which the retard adjustment is consecutively carried out, and means for beginning the retard adjustment when knock occurs and continuing to carry out the retard adjustment within the second period even when no knock occurs.

BRIEF EXPLANATION OF THE DRAWINGS

These and other objects and advantages of the invention will be more apparent from the following description and drawings, in which.

DETAILED DESCRIPTION OF PREFERRED EMBODIMENT

The invention will be now be exlained with reference to specific embodiments.

Figure 1:
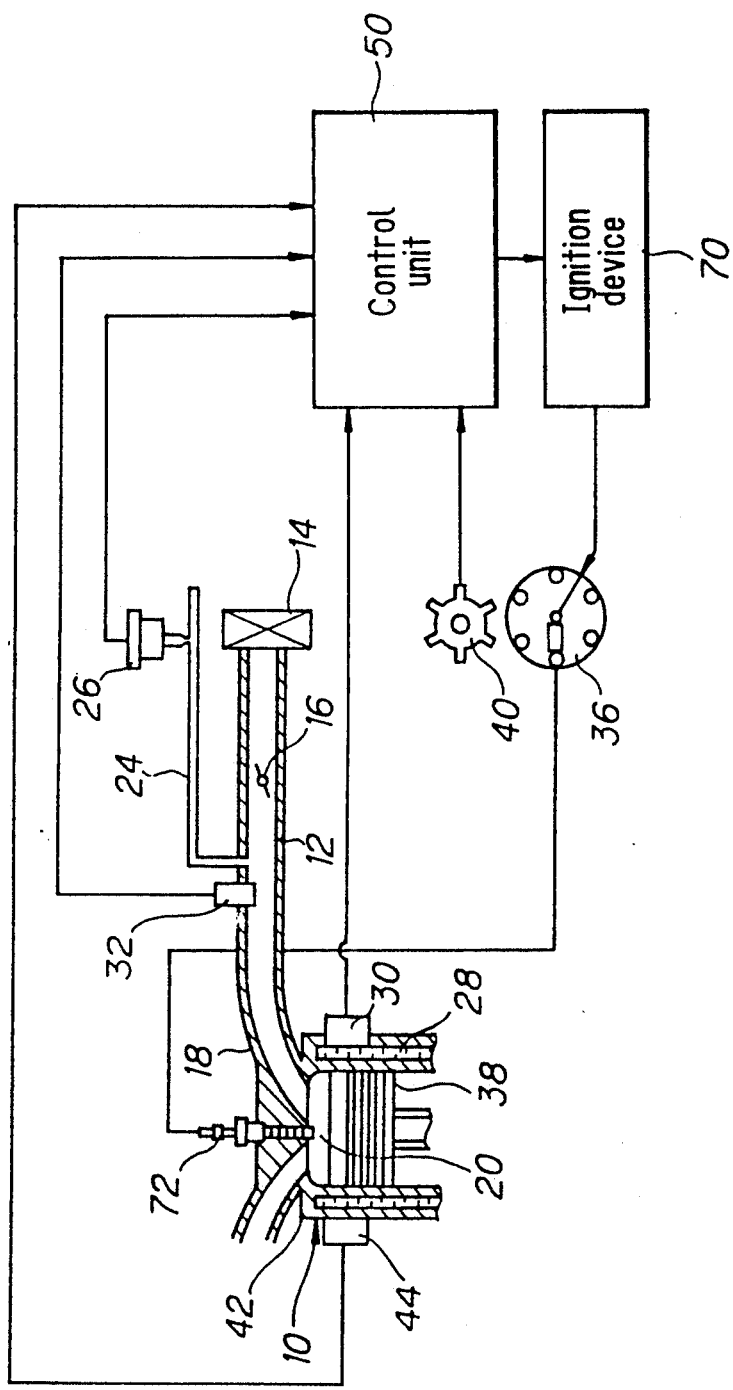
FIG. 1 is a schematic view of an ignition timing control system for internal control engines according to the present invention.

FIG. 1 shows the overall arrangement of an ignition timing control system for internal combustion engines in accordance with this invention. A six-cylinder vehicle internal combustion engine 10 has an air intake passage 12 provided at its distal end with an air cleaner 14. Air drawn in through the air cleaner 14 has its flow rate controlled by a throttle valve 16 and passes through a manifold 18 to combustion chambers 20 (only one shown). A pipe 24 branches off from the air intake passage 12 at an appropriate position downstream of the throttle valve 16. The pipe 24 is provided near its far end with an intake air pressure sensor 26 which detects the engine load by measuring the absolute value of the intake air pressure. A coolant temperature sensor 30 is provided in the vicinity of a coolant passage 28 of the internal combustion engine 10 for detecting the temperature of the engine coolant and an intake air temperature sensor 32 is provided in the air intake passage 12 at an appropriate position downstream of the throttle valve 16 for detecting the temperature of the air drawn into the engine.

The internal combustion engine 10 has a distributor 36 which includes a crank angle sensor 40 comprised of a magnet which rotates in synchronism with a crankshaft (not shown) rotated by the reciprocal motion of pistons 38 (only one shown) and a stationary member disposed opposite the magnet. The crank angle sensor 40 outputs a pulse signal once every predetermined angle of crankshaft rotation. At an appropriate location on the block 42 of the internal combustion engine 10 is provided a piezoelectric knock sensor 44 for detecting vibration produced by combustion knock arising within the combustion chambers 20. The outputs of the intake air pressure sensor 26 and the other sensors 30, 32, 40 and 44 are forwarded to a control unit 50.

Figure 2:
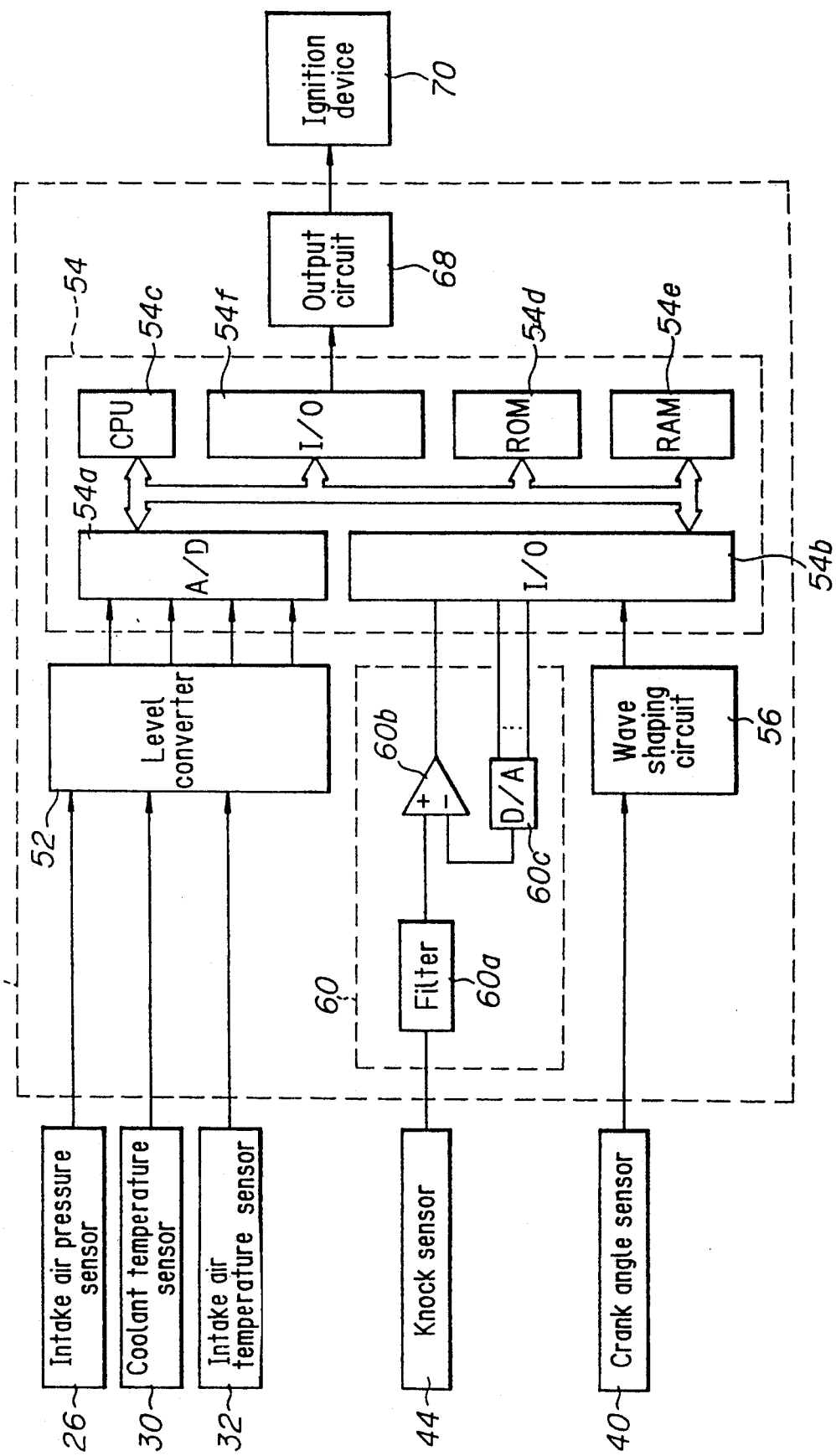
FIG. 2 is a block diagram showing the detailed arrangement of the control unit of the system of FIG. 1.

The arrangement of the control unit 50 is illustrated in FIG. 2. The outputs from the intake air pressure sensor 26, the coolant temperature sensor 30 and the intake air temperature sensor 32 are input to a level converter 52 in the control unit 50 for adjustment to a prescribed level and are then forwarded to a microcomputer 54. The microcomputer 54 comprises an A/D converter 54a, I/O circuits 54b, 54f, a CPU (central processing unit) 54c, a ROM (read-only memory) 54d, a RAM (random access memory) 54e, and counters for computation and timers (the two last mentioned members not being shown). The signals output by the level converter 52 are converted to digital values by the A/D converter 54a in accordance with commands from the CPU 54c and are then temporarily stored in the RAM 54e. The digital outputs of the crank angle sensor 40 is shaped in a wave shaping circuit 56 and then input to the microcomputer 54 through the I/O circuit 54b.

Figure 3:
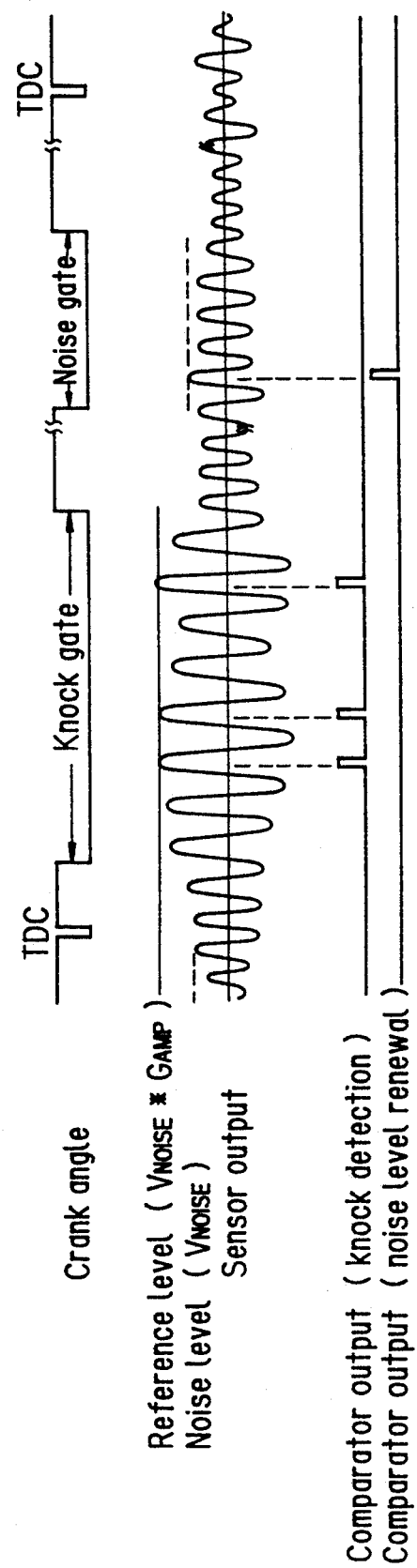
FIG. 3 is a timing chart showing the operation of the knock detection circuit of FIG. 2.

After being sent to the control unit 50, the output from the knock sensor 44 is input to a knock detection circuit 60. The knock detection circuit 60 comprises a filter 60a, a comparator 60b and a D/A converter 60c. The occurrence of combustion knock is detected in the comparator 60b by comparing a reference value received from the microcomputer 54 through the D/A converter 60c with the sensor output value received through the filter 60a. As shown more specifically in FIG. 3, the sensor output value is peak-held in a range of crank angles located in a region free from combustion and referred to as the "noise gate." The peak-held value referred to as "noise level ($V_{NOISE}$)" in the figure corresponds to mechanical vibration of the engine. The noise level detected is then amplified in the microcomputer 54 by $G_{AMP}$ to obtain the aforesaid reference value, which is then sent, through the D/A converter 60c, to the comparator 60b as mentioned earlier and is compared with the sensor output value in a crank angle range during which combustion arises referred to as the "knock gate". Every time the sensor output value at the knock gate exceeds the reference value, the comparator 60b produces a pulse as shown at the bottom of the figure. Similarly, the noise levels are compared with each other and if current noise level exceeds the previous one, the comparator 60b generates a pulse for renewing the level.

The microcomputer 54 calculates the engine speed from the output of the crank angle sensor 40 and determines the engine load from the output of the pressure sensor 26. Based on these values and from other operating conditions and the presence/absence of knock, it also determines the ignition timing in a manner explained later and issues an ignition command via the I/0 circuit 54f and an output circuit 68 to an ignition device 70, thereby causing a spark plug 72 of a prescribed cylinder selected by the distributor 36 to fire and ignite the air-fuel mixture in the associated combustion chamber 20.

The operation of the control system will now be explained with reference to the flowcharts, beginning with FIG. 4. It should be noted that the present invention is not characterized by the ignition timing control itself but, as explained in the foregoing, by the determination of the knock occurrence rate and the retard adjustment based on the determined rate. The following explanation will therefore focus on this point. The program according to the flowchart of FIG. 4 is executed by the microcomputer 54 on an interrupt basis at a predetermined crank angle.

Figure 4:
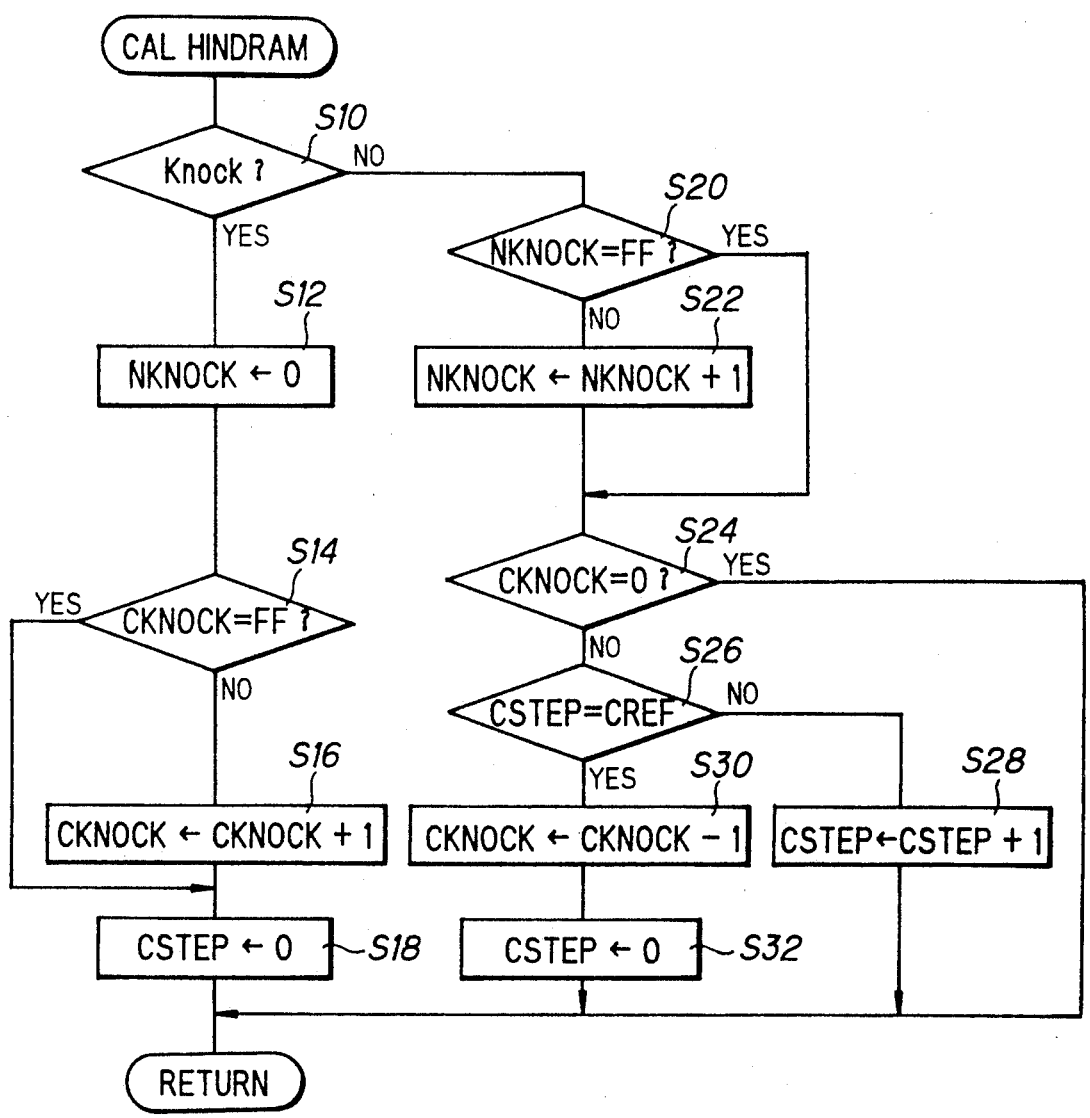
FIG. 4 is a flowchart for determining the knock occurrence rate.

Referring to FIG. 4, the procedure begins at step S10 in which it is judged if knock is present. This judgment is made based on the output of the comparator 60b in the knock detection circuit 60. In order to avoid erroneous detection owing to a noise, it is judged that knock is present if, for example, two or more pulses have been generated within one knock gate.

If it is confirmed at step S10 that knock has occurred, the procedure advances to step S12 in which a counter $N_{KNOCK}$, explained later, is reset to zero (started), and to step S14 in which it is confirmed if a value of another counter $C_{KNOCK}$, explained later, has reached its maximum. If it is confirmed in step S14 that the counter value has not reached the maximum, the procedure then moves to step S16 in which the counter $C_{KNOCK}$ is incremented by one, and to step S18 in which a third counter $C_{STEP}$ for counting the number of firings is reset to zero.

On the other hand, when the result of the judgment at step S10 is negative, the procedure advances to step S20 in which it is confirmed whether the counter $N_{KNOCK}$ has reached its maximum and if not, the procedure goes to step S22 in which the counter is incremented by one. The counter $N_{KNOCK}$ is provided for counting the number of successive firings during which no knock occurs. The procedure then advances to step S24 in which it is judged if the counter value $C_{KNOCK}$ is zero. If not, the procedure advances to step S26 in which it is judged if the counter value $C_{STEP}$ is equal to a reference value $C_{REF}$ appropriately set as, for example, "6". If the result of the judgment is negative, the procedure advances to step S28 in which the counter value $C_{STEP}$ is incremented by one. If the result of the judgment is affirmative, the procedure advances to step S30 in which the counter value $C_{KNOCK}$ is decremented by one and to step S32 in which the counter $C_{STEP}$ is reset to zero, concluding the current program cycle.

Figure 5:
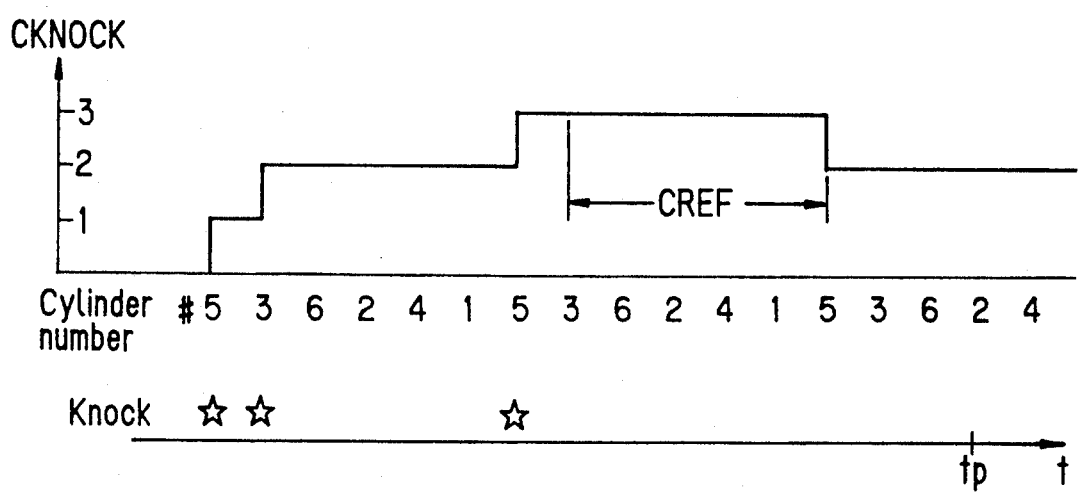
FIG. 5 is a timing chart for explaining the determination of the knock occurrence rate.
Figure 7:
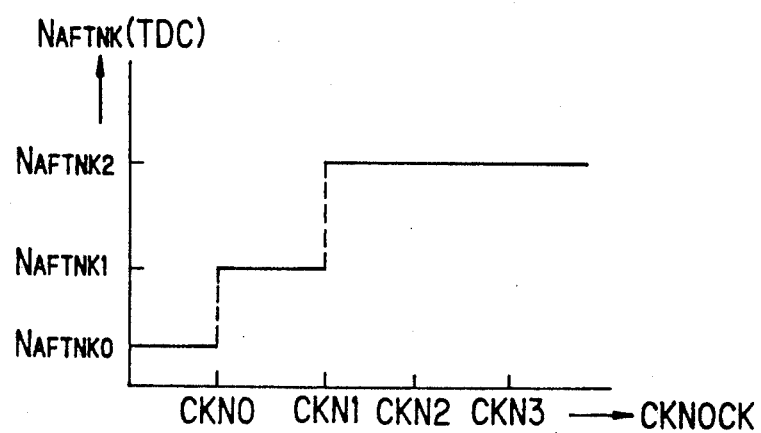
FIG. 7 is a diagram for explaining a consecutive retarded firing number used in the flowchart of FIG. 6.

As mentioned in the foregoing, the counter $C_{KNOCK}$ is provided for indicating the knock occurrence rate and is arranged in the embodiment such that it is incremented by one when knock occurs, while it is decremented by one when no knock occurs for the predetermined 6 firings. FIG. 5 shows this more specifically. In the figure, the abscissa indicates the firing order of the six-cylinder engine. Assume that knock, as indicated by asterisks in the figure, occurred consecutively in the 5th cylinder and in the 3rd cylinder in a given cycle and again in 5th cylinder in the next firing cycle. The counter value is incremented by one each time knock occurs and is then decremented when the firing number counter $C_{STEP}$ counts 6 firings ($=C_{REF}$) during which no knock has occurred.

In the figure, the counter value $C_{KNOCK}$ is "2" at a time point tp. From this value, however, it cannot be precisely judged how many firings have suffered knock, and the interval between the firings in which knock occurred is also not clear. Thus, the counter value does not reflect the detailed history of the past firings. However, it is not knock occurring intermittently (at long intervals) but knock occurring successively (at short intervals) that may seriously damage the engine. Whether or not knock occurs successively at short intervals can be judged from the counter value $C_{KNOCK}$ provided that the reference firing number $C_{REF}$ indicating the wait period for decrementing the counter value is appropriately determined. To be more specific, if the reference value is set to be a relatively large firing number, then when knock occurs at relatively short intervals, the counter value $C_{KNOCK}$ will be successively incremented, without being decremented. More specifically, since the present embodiment is configured for a six-cylindered engine, the reference value is set to be "6," as mentioned earlier. Thus, since the counter value is set to be equal to the number of the cylinders, if a certain cylinder, for example the 5th cylinder, experiences knock as was shown in FIG. 5, the knock occurring in this cylinder can be checked against the knock occurrence condition of the other cylinders. Namely, if the counter value does not change after completion of one firing cycle, this can be judged to mean that knock occurs only at a particular (5th) cylinder. Similarly, if the counter value increases, it can be judged from the value that knock occurs at a particular (5th) cylinder and at some other cylinder(s). On the other hand, if the counter value decreases, it is apparent that no knock has occurred in any of the cylinders. If the reference number is set to a number smaller than the number of cylinders, for example to "2" or "3," such a judgment would not be possible. From the above, it can be seen that the reference number $C_{REF}$ is preferably set to be a multiple of the number of engine cylinders. With the arrangement, it is possible to judge that the knock occurrence rate is "great" if knock occurs successively at two or more cylinders within short intervals during one or two firing cycles, as illustrated in FIG. 5.

The calculation of a knock adjustment value will now be explained with reference to FIGS. 6-9.

Figure 6:
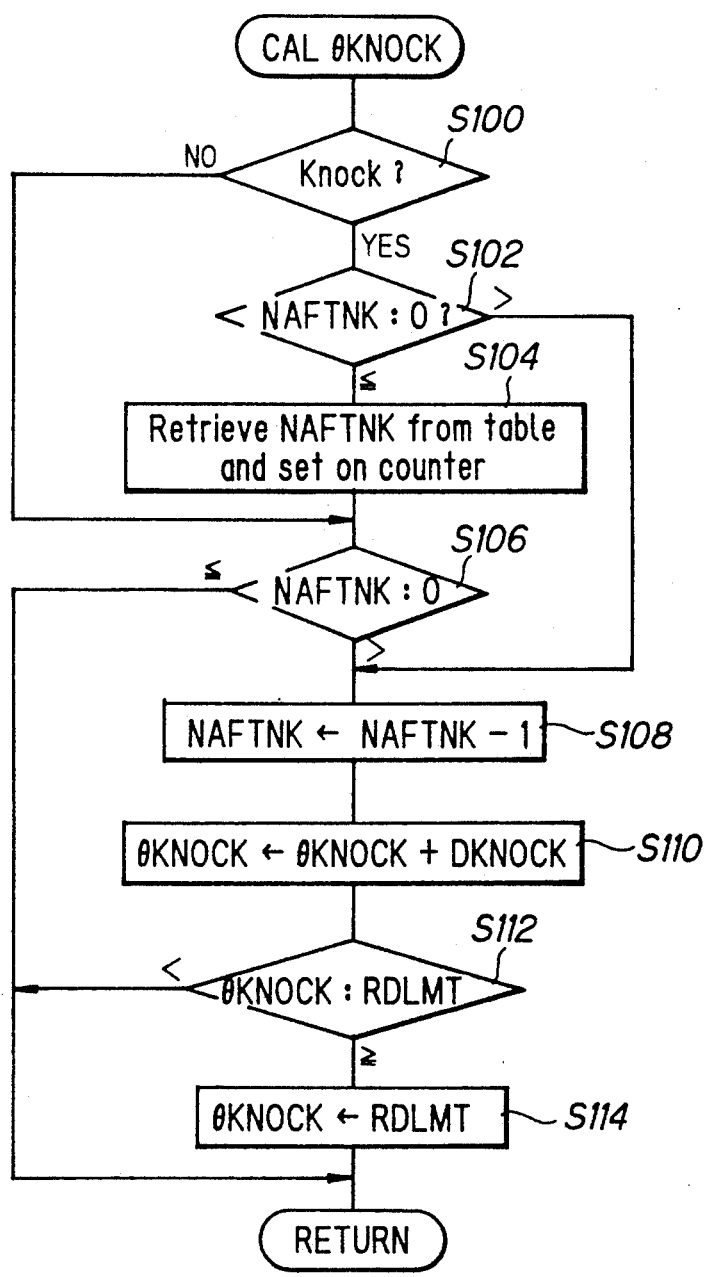
FIG. 6 is a flowchart for calculating a knock adjustment value in the retard direction.

The flowchart of FIG. 6 shows an example of how the knock adjustment value is calculated in the retard direction based upon the knock occurrence rate.

The procedure begins with the judgement of the presence/absence of knock in step S100. When knock is found to be present, the procedure moves to step S102 in which it is determined whether or not a counter value NAFTNK (explained below) remains. As in the first program cycle this value is in its initial zero state, the result of the determination is negative so that the procedure moves to step S104 in which the value NAFTNK is retrieved from the diagram shown in FIG. 7 and is set on the counter. This value indicates the number of firings during which retard adjustment is consecutively carried out. As will be noted in this diagram, toward the TDC position, this number increases stepwise is proportion as the knock occurrence rate counter value CKNOCK increases.

The procedure then advances to step S106 in which it is judged whether or not the consecutive retarded firing number NAFTNK is zero. If not, the procedure advances to step S108 in which this number is decremented by one, to step S110 in which a unit retard amount DKNOCK, a fixed value, is added to the knock adjustment value $\phi$KNOCK to adjust it in the retard direction, to step S112 in which it is judged whether or not the adjusted retard target value exceeds the value of a maximum retard value RDLMT, and if it does, to step S114 in which the knock adjustment value is replaced by the maximum retard value. This replacement is conducted for preventing the exhaust temperature from rising excessively. As is clear from FIG. 6, when the consecutive retarded firing number NAFTNK is set at 2 or a higher value, even if knock is found to be absent at the beginning of the following cycle, ignition retard is continued. (Steps S100, S106, S108 and so on.)

Figure 8:
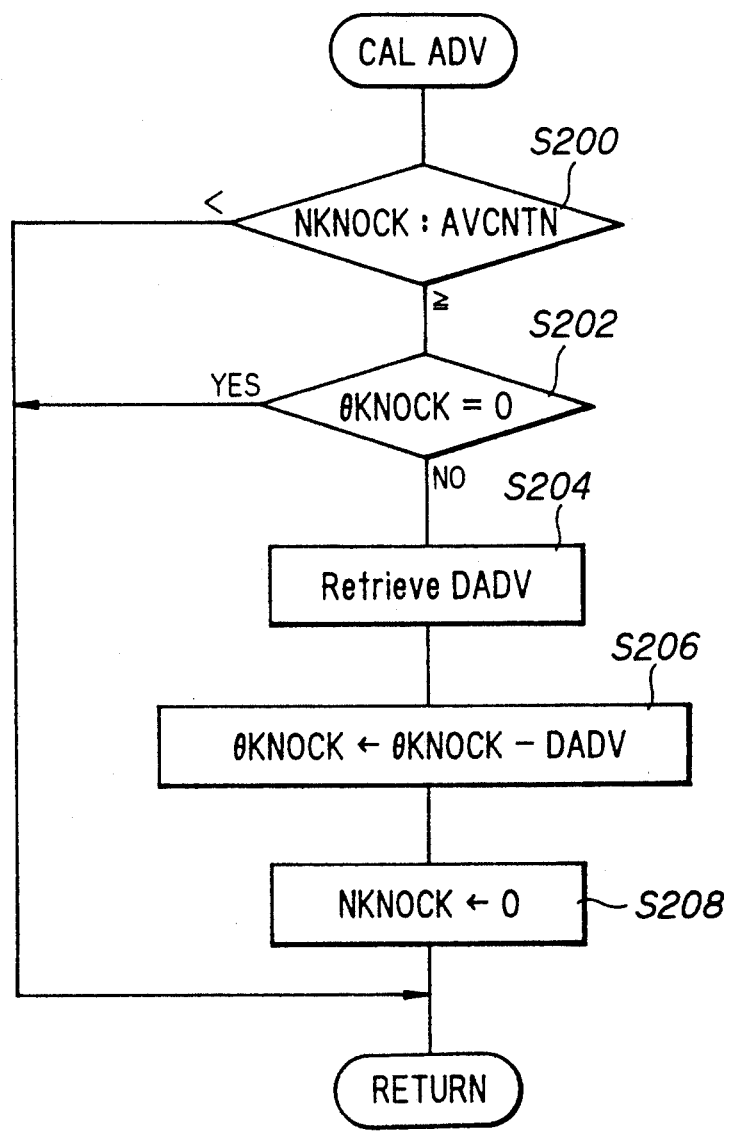
FIG. 8 is a flowchart for correcting the knock adjustment value in the advance direction.
Figures 9, 11:
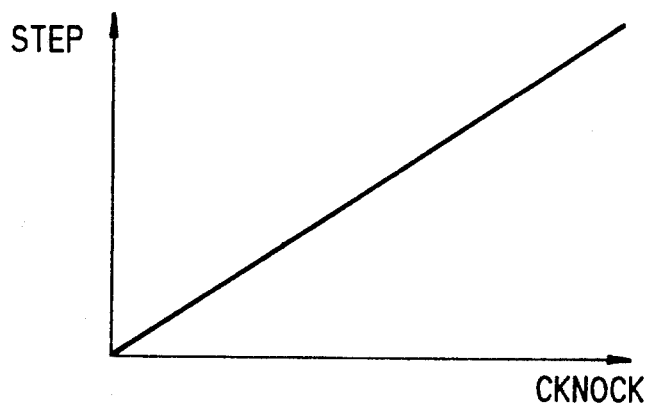
FIG. 9 is a map for explaining the characteristics of the unit advance amount.
FIG. 11 is a graph for explaining the characteristics of a reference value corresponding to a wait resent invention.

FIG. 8 relates to the case where the knock adjustment value is adjusted in the advance direction. The procedure according to the flowchart of FIG. 8 starts with step S200 in which it is determined whether or not the aforesaid counter value NKNOCK exceeds a prescribed firing number AVCNTN. The value AVCNTN is the number of firings during which advance should be deferred. When it is found in step S200 that no knock occurred during the prescribed number of firings, after having confirmed at step S202 that the knock adjustment value is not zero, the procedure advances to step S204 in which a unit advance amount DADV is retrieved from a map stored in ROM 54d. The characteristics of this map are shown in FIG. 9. As will be noted from this map, the unit advance amount is set as a function of the engine speed NE and the manifold pressure PB (engine load). The procedure next goes to step S206 in which the knock adjustment value is reduced by the amount of the retrieved unit advance amount to adjust it in the advance direction, and to step S208 in which the consecutive knock-free firing number counter is reset to zero, concluding the program.

The so-determined knock adjustment value is added to the basic ignition timing and the final ignition timing is determined by further addition of other adjustment values such as that for the temperature of the engine coolant. However, as these operations are known to the art and have no bearing on the gist of the present invention, they will not be discussed further here.

In the foregoing, when the knock occurrence rate counter value is found to increase, the retard adjustment is successively carried out by the unit amount even if no knock occurs. Thus, when the knock occurrence rate is great, the total knock adjustment value becomes great. As a result, it is possible to suppress knock in a short period even in an engine operating region where knock is liable to recur. Further, since the retard adjustment is carried out not by increasing the magnitude of the unit amount, but by increasing the number of firings during which the consecutive retard adjustment is carried out, it will be possible, even in a system in which the retard adjustment value is equally applied to all cylinders or in a system in which the cylinders are grouped and the value is equally applied to each group of cylinders, to avoid knock recurrence while minimizing the effect on cylinders in which knock is not present. Furthermore, the counters used in the embodiment require a memory of only small capacity.

Figure 10:
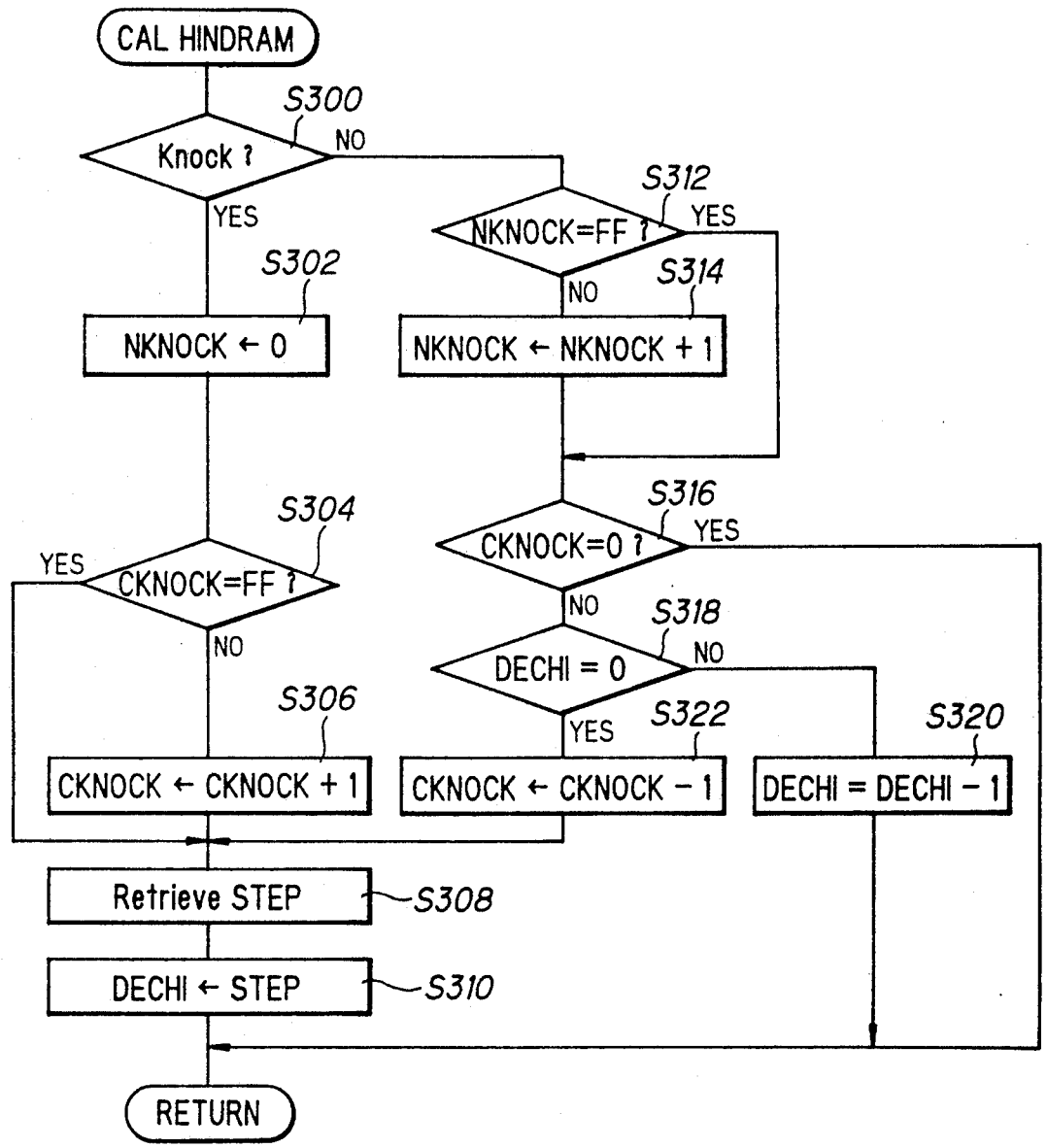
FIG. 10 is a flowchart, similar to FIG. 4, but relating to a second embodiment according to the present invention.

FIG. 10 is a flowchart, similar to FIG. 4, but relating to a second embodiment of the present invention. Only the aspects thereof which differ from the first embodiment shown by the FIG. 4 flowchart will be explained.

In the flowchart, if it is determined that knock has occurred, the counter value $C_{KNOCK}$ is incremented through steps S300-S306 and at step S308 a value STEP, which is similar to the aforesaid reference value $C_{REF}$, is retrieved from a table stored in ROM 54d. FIG. 11 shows the characteristics of the table and, as illustrated, the value STEP is established in proportion to the knock occurrence rate counter value $C_{KNOCK}$. At the next step S310, the retrieved value is set on a down counter $D_{ECHI}$.

On the other hand, if no knock is found to occur at step S300, after having confirmed at step S312 that the counter is not at maximum value and at step S316 that the knock occurrence rate counter value is not zero, the procedure advances to step S318 in which it is judged if the down counter value has reached zero. If it has not, the procedure goes to step S320 to decrement the counter value. If it has, the procedure advances to step S322 in which the knock occurrence rate counter is decremented, and to steps S308 and S310 in which the down counter value is newly set in response to the knock occurrence rate, concluding the current program cycle.

In the second embodiment, since the opportunity for decrementing the knock occurrence rate counter value is decreased as the knock occurrence rate increases, the counter value can reflect the knock recurring condition more precisely so that it is possible to suppress knock more effectively in the region in which knock would otherwise recur.

In the second embodiment, the reference value STEP is varied depending on the knock occurrence rate. The value can, however, be varied depending on the engine operating conditions, in which case it becomes possible to realize a knock control in which the engine operating conditions are reflected more directly.

It should be noted that although in the first and second embodiments, the reference values $C_{REF}$ and STEP are expressed in terms of the number of firings, it is also possible to express them in terms of time.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling ignition timing of a vehicle internal combustion engine, including:
   first means for detecting operating conditions of the engine including at least engine speed and engine load;
   second means for detecting knock occurring in the engine;
   control means for determining a basic ignition timing of the engine based on the detected engine speed and engine load and for adjusting the basic ignition timing in the retard direction when knock occurs; and
   ignition means for igniting an air-fuel mixture in a combustion chamber of the engine;
   wherein the improvement comprises:
   said control means including:
   counter means, the value of which is incremented each time knock occurs and is decremented if no knock occurs
   means for determining, based on the counter value, a second period during which the retard adjustment is consecutively carried out; and
   means for beginning the retard adjustment when knock occurs and continuing to carry out the retard adjustment within the second period even when no knock occurs.

2. A system according to claim 1, wherein said predetermined first period is a value corresponding to a multiple of the number of cylinders of the engine 3. A system according to claim 2, wherein said predetermined first period is a value expressed in terms of the number of firings.

4. A system according to claim 1, wherein said predetermined first period is a value which varies with the counter value.

5. A system according to claim 4, wherein said predetermined first period is a value which is proportional to the counter value.

6. A system according to claim 1, wherein said second period is prolonged as the counter value increases.

7. A system for controlling ignition timing of a vehicle internal combustion engine, including:
   first means for detecting operating conditions of the engine including at least engine speed and engine load;
   second means for detecting knock occurring in the engine:
   control means for determining a basic ignition timing of the engine based on the detected engine speed and engine load and for adjusting the basic ignition timing in the retard direction when knock occurs; and
   ignition means for igniting an air-fuel mixture in a combustion chamber of the engine;
   wherein the improvement comprises:
   said control means including:
   counter means, the value of which is incremented when knock occurs and is decremented if no knock occurs within a predetermined first period; and
   means for determining, based on the counter value, a second period during which the retard adjustment is consecutively carried out by a prescribed amount; and
   means for beginning the retard adjustment when knock occurs and continuing to carry out the retard adjustment within the second period even when no knock occurs.

8. A system according to claim 7, wherein said prescribed retard amount varies with the engine speed and engine load.

* * * * *